US012441539B2

(12) United States Patent
Rimsa

(10) Patent No.: US 12,441,539 B2
(45) Date of Patent: Oct. 14, 2025

(54) TRUNNION BAR LOCKER ASSEMBLY

(71) Applicant: Perkins Manufacturing Co., Bolingbrook, IL (US)

(72) Inventor: James Rimsa, Shorewood, IL (US)

(73) Assignee: Perkins Manufacturing Co., Bolingbrook, IL (US)

( * ) Notice: Subject to any disclaimer, the term of this patent is extended or adjusted under 35 U.S.C. 154(b) by 377 days.

(21) Appl. No.: 18/315,710

(22) Filed: May 11, 2023

(65) Prior Publication Data

US 2024/0375860 A1 Nov. 14, 2024

(51) Int. Cl.
*B65F 3/02* (2006.01)

(52) U.S. Cl.
CPC ........ *B65F 3/02* (2013.01); *B65F 2003/0243* (2013.01)

(58) Field of Classification Search
CPC ........................... B65F 2003/0243; B65F 3/02
See application file for complete search history.

(56) References Cited

U.S. PATENT DOCUMENTS

| | | | | |
|---|---|---|---|---|
| 5,006,030 A * | 4/1991 | Smith | B65F 3/04 414/408 |
| 5,425,613 A | 6/1995 | Osborn | |
| 5,720,588 A * | 2/1998 | Graves | B65F 3/02 414/421 |
| 6,027,299 A * | 2/2000 | Williams | B65F 3/041 414/408 |
| 6,224,317 B1 * | 5/2001 | Kann | B65F 3/041 414/408 |
| 6,413,031 B1 * | 7/2002 | Yakley | B65F 3/02 414/408 |
| 9,561,904 B1 | 2/2017 | Osborn | |
| 11,001,440 B2 * | 5/2021 | Rocholl | B65F 3/041 |
| 2023/0023747 A1 * | 1/2023 | Clifton | G06F 3/0482 |

* cited by examiner

*Primary Examiner* — Jonathan Snelting
(74) *Attorney, Agent, or Firm* — Cook Alex Ltd.

(57) ABSTRACT

A trunnion bar locker assembly for a rear load refuse vehicle for use when dumping a refuse container having a trunnion bar, includes a pair of spaced apart locking assemblies, each locking assembly further including a base frame to be connected to the refuse vehicle, a trunnion bar receiver connected to the base frame, a locker door connected to the base frame and having an open position wherein the trunnion bar receiver removably receives an end of the trunnion bar of the refuse container, and a closed position wherein the pivotable locker door confines the end of the trunnion bar in the receiver, an electrically powered actuator coupled to the base frame and to the pivotable locker door, and a controller connected to each respective locking assembly to control the actuator to move the pivotable locker door between the open and closed positions.

18 Claims, 9 Drawing Sheets

TRUNNION BAR LOCKER ASSEMBLY

BACKGROUND

Field of the Disclosure

The present disclosure relates to systems for rear load refuse vehicles. More particularly, the present disclosure relates to an improved trunnion bar locker assembly for use in dumping a refuse container into a rear load refuse vehicle.

Description of Related Art

Those familiar with rear load refuse vehicles know that an operator may dump various sized bins or containers into a rear hopper that defines a refuse collection cavity. Larger bins from commercial refuse generators may be handled with a cable and winch or reeve cylinder. Larger bins may have standards to be adhered to, such as is the case with many containers referred to as ANSI Type T containers, which feature a trunnion bar. The trunnion bar extends across the top front of the container and is configured to be used when tipping the container to dump the contents into the rear hopper on the rear load refuse vehicle.

Many prior art vehicles have manual trunnion bar locker assemblies, which permit an operator to insert the trunnion bar into receivers at each end of the vehicle tailgate to lock the container in place for operational safety. However, the manual trunnion bar locker assemblies have to be opened and closed by hand. This is time consuming for the operator because the operator must walk from one side of the vehicle to the other to manually use such assemblies. The extra time and effort required to walk from side to side and to manually engage the lock bars unfortunately tends to discourage operators from using of the assemblies, which can result in operator injuries or even death.

Some prior art vehicles have hydraulically powered trunnion locker bar assemblies. Such hydraulically powered assemblies require the vehicle to have a hydraulic system but do enable an operator to engage assemblies on both sides of the vehicle by using a lever. Such systems do require utilization of a portion of the vehicles hydraulic capacity.

SUMMARY

The disclosure pertains to trunnion bar locker assemblies for improved efficiency and safety when dumping large refuse containers having a trunnion bar into rear load refuse vehicles. The trunnion bar locker assemblies are electrically powered and provide an operator the ability to close and reopen trunnion bar locker assemblies on each side of the refuse vehicle by manipulating a single controller. The assemblies of the present disclosure may be configured for mounting at the rear of rear load refuse vehicles. The trunnion bar locker assemblies enhance the ability of an operator to more quickly and conveniently employ added safety, when needing to dump a refuse container having a trunnion bar into a hopper that is integrated into or carried by a refuse vehicle.

If a refuse vehicle is fossil fueled and has hydraulic systems, the electrically powered trunnion bar locker assemblies will advantageously forego requiring some of the hydraulic systems to be dedicated to operating a hydraulically powered trunnion bar locker assembly. The electrically powered trunnion bar locker assemblies also may be installed on refuse vehicles that are partially hydraulically powered, or installed on refuse vehicles that are exclusively electrically powered, thereby eliminating the need for hydraulic capacity altogether. The assemblies utilize a DC electrical power source, whether provided via a dedicated battery, a vehicle battery or other electrical power generating system.

As disclosed herein, the trunnion bar locker assemblies of the present disclosure are electrically powered and utilize actuators that move locker doors at the respective sides of the rear of the refuse vehicle, in a relatively reliable and compact configuration. The assemblies have at least an open position and a closed position for the locker doors. The open position permits entry of a trunnion bar of a refuse container, while the closed position captures the trunnion bar to more safely and securely permit the refuse container to be tilted and dumped into the hopper of the refuse vehicle.

The present disclosure provides several aspects of the subject matter which may be embodied separately or together in the devices and systems described and claimed herein. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a trunnion bar locker assembly is provided for a rear load refuse vehicle for use when dumping a refuse container having a trunnion bar. The trunnion bar locker assembly includes a pair of spaced apart locking assemblies, each locking assembly including a base frame to be connected to the refuse vehicle, a trunnion bar receiver connected to the base frame, a locker door connected to the base frame and having an open position wherein the trunnion bar receiver removably receives an end of the trunnion bar of the refuse container, and a closed position wherein the pivotable locker door confines the end of the trunnion bar in the receiver. The trunnion bar locker assembly also includes an electrically powered actuator coupled to the base frame and to the locker door, and a controller connected to each respective locking assembly to control the actuator to move the locker door between the open and closed positions.

BRIEF DESCRIPTION OF DRAWINGS

In describing the preferred example embodiments, reference is made to the accompanying drawing figures wherein like parts have like reference numerals, and wherein.

It should be understood that the drawings are not necessarily to scale, with some views enlarged for enhanced viewing. While some details of the example trunnion bar locker assembly, including details of fastening means and other plan and section views of the particular components may not be shown, such details are considered to be within the comprehension of those skilled in the art in light of the present disclosure. It also should be understood that the present disclosure and claims are not limited to the preferred embodiments illustrated.

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

Referring generally to FIGS. 1-13, it will be appreciated that trunnion bar locker assemblies of the present disclosure may be embodied in numerous configurations and for connection to various rear load refuse vehicles. For example, the trunnion bar locker assemblies may be connected to a rear sill and/or sides of a refuse vehicle. The teachings within this disclosure also pertain to use of electrically powered actuators that may be used in trunnion bar locker assemblies having various trunnion bar and container engaging configurations selected confine ends of a trunnion bar on a refuse container to facilitate tilting a refuse container to dump the contents of the container into a hopper defining a refuse collection cavity that is carried by or integrated into a rear load refuse vehicle.

Figure 1:
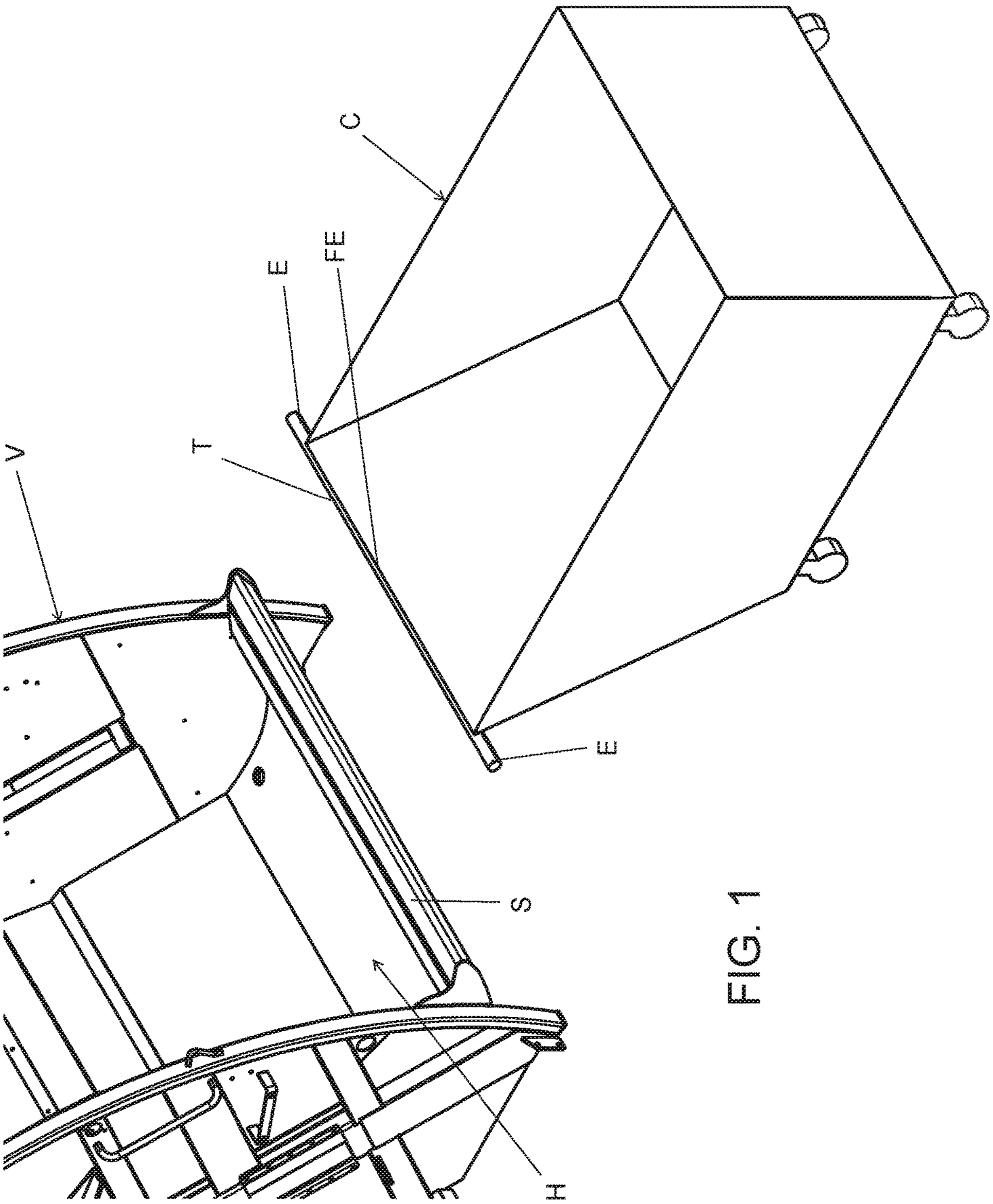
FIG. 1 is a rear perspective view illustrating a typical ANSI Type T container having a trunnion bar and a rear end of a rear load refuse vehicle.

For instance, FIG. 1 illustrates an example rear load refuse vehicle V and a typical ANSI Type-T refuse container C having a trunnion bar T. The trunnion bar T shown extends along the top front edge FE of the container C and includes ends E extending laterally outward from the container. It will be appreciated that some trunnion bars include enlarged discs mounted at the ends E, which may be used to assist in controlling engagement with such trunnion bars.

Figure 2:
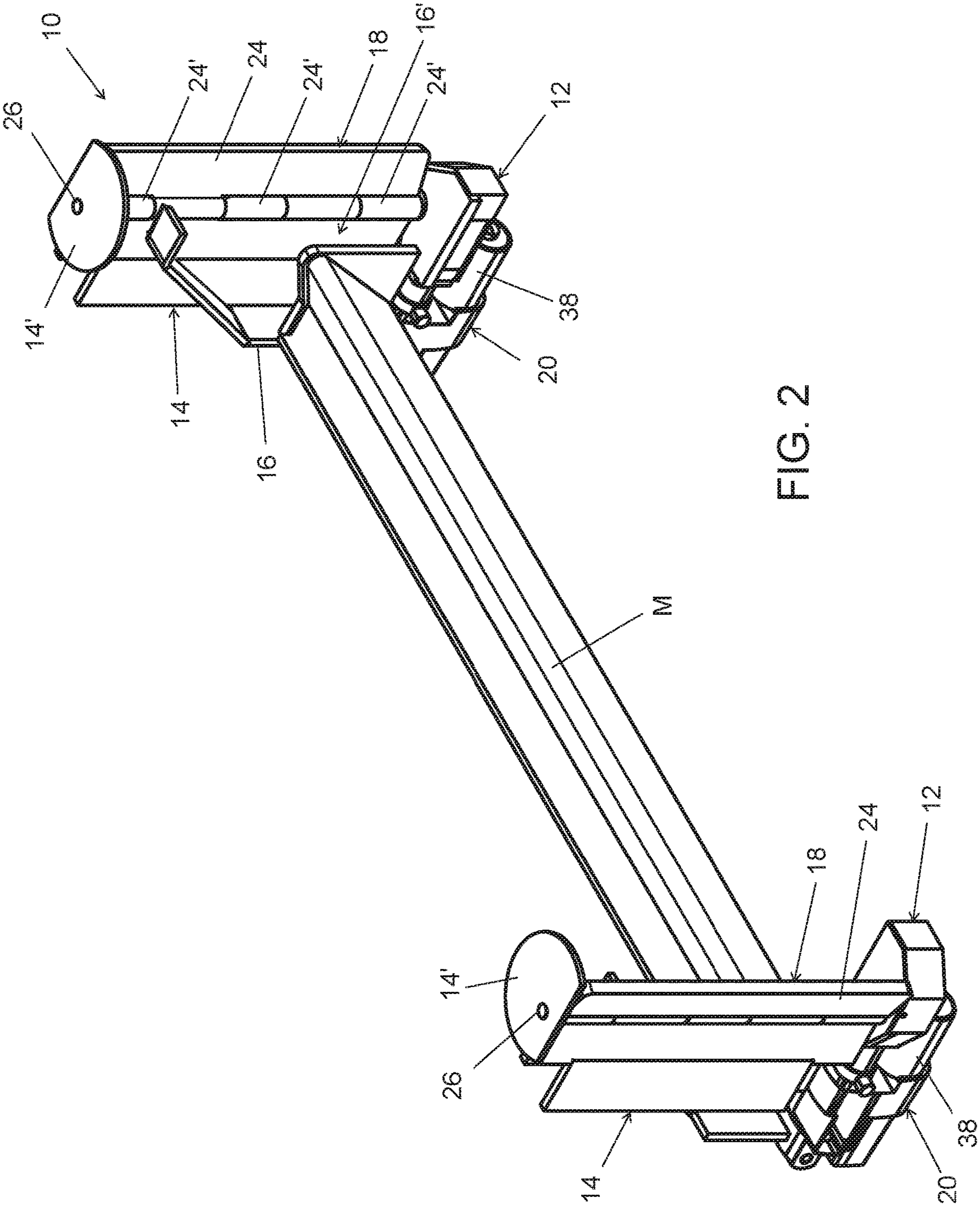
FIG. 2 is a rear perspective view of spaced apart locking assemblies of an example trunnion bar locker assembly, shown relative to a rear sill of a rear load refuse vehicle for ease of viewing.
Figure 3:
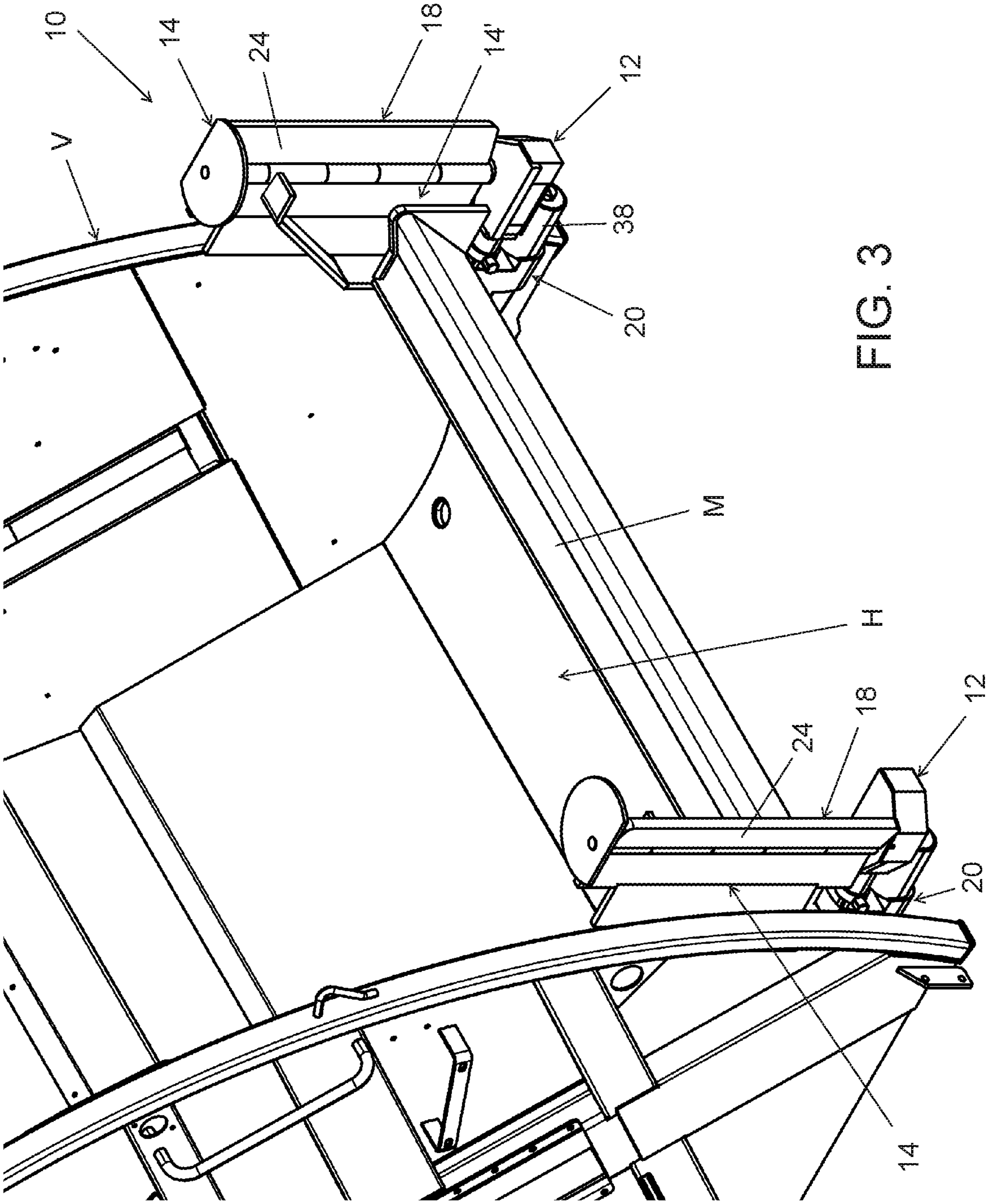
FIG. 3 is a rear perspective view of the trunnion bar locker assembly of FIG. 2 connected to the rear end of the refuse vehicle of FIG. 1.
Figure 5:
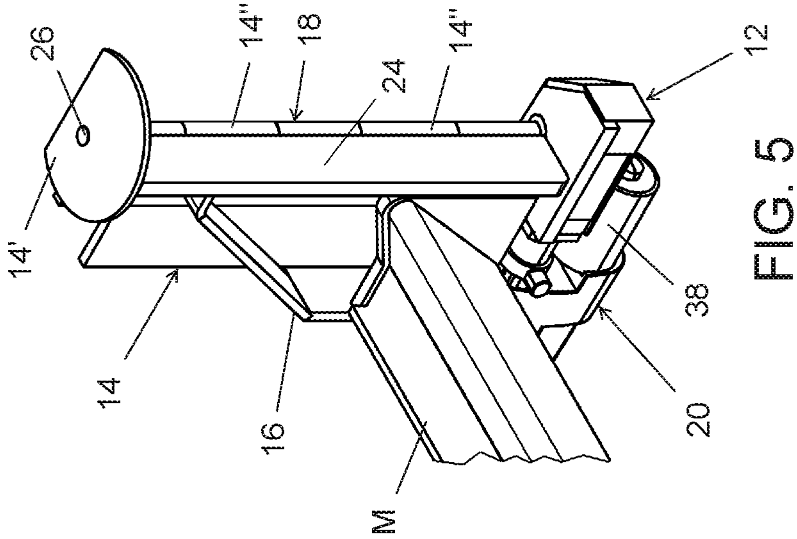
FIG. 5 is an enlarged rear perspective view of locking assembly of FIG. 4 shown with the locker door in a closed position.

FIG. 2 shows a trunnion bar locker assembly 10 for a rear load refuse vehicle V for use when dumping a refuse container C having a trunnion bar T, comprising, a pair of spaced apart locking assemblies 12. Each locking assembly 12 further includes a base frame 14 to be connected to the refuse vehicle V, a trunnion bar receiver 16 connected to the base frame 14, a locker door 18 coupled to the base frame 14 and having an open position, shown in FIGS. 2-4, wherein the trunnion bar receiver 16 removably receives an end E of the trunnion bar T of the refuse container C, and a closed position, shown in FIGS. 5, 9 and 10, wherein the locker door 18 confines the end E of the trunnion bar T in the receiver 16, and an electrically powered actuator 20 coupled to the base frame 14 and to the locker door 18. The trunnion bar locker assembly 10 further includes a controller 22, as will be discussed further herein, with the controller 22 connected to each respective locking assembly 12 to control the respective actuator 20 to move the locker door 18 between the open and closed positions.

The trunnion bar receivers 16 are constructed to provide pockets that receive the ends E of the trunnion bar T. The receivers 16 also provide the surfaces against which the ends E pivot when the refuse container C is tilted to an inverted position to dump contents from the container C into the hopper H of the rear load refuse vehicle. The receivers 16 are shown in a configuration that also is equipped to receive a trunnion bar that has flanges connected to the opposed ends E of the trunnion bar T. The flanges may be received by the gap 16' between the pocket and the pivotable connection of the locker door 18 to the base frame 14.

Each base frame 14 of the example trunnion bar locker assembly 10 is configured to be connected to the refuse vehicle V to locate the locking assemblies 12 proximate respective ends of a rear sill S of the refuse vehicle V. The rear sill S is the top of the rear wall of a hopper H that defines a refuse collection cavity. The base frames 14 may be connected together for ease of installation and consistent alignment by a central mounting structure M, shown in FIG. 2, which can be used to connect the trunnion bar locker assembly 10 to the rear sill S. The connection may be removable, by use of mechanical fasteners or the like, or permanent such as by welding the mounting structure M to the vehicle V or by welding the individual locking assemblies 12 to the vehicle V. In the example shown, each locker door 18 is pivotably coupled to the base frame 14. As will be appreciated from FIGS. 2 and 4-8 each locker door 18 also includes a panel 24 and knuckles 24' pivotably coupled to the base frame 14 via a shaft 26 and respective knuckles 14" of the base frame 14. The shaft 26 is received at its upper end by flange 14' of each base frame 14.

Figure 6:
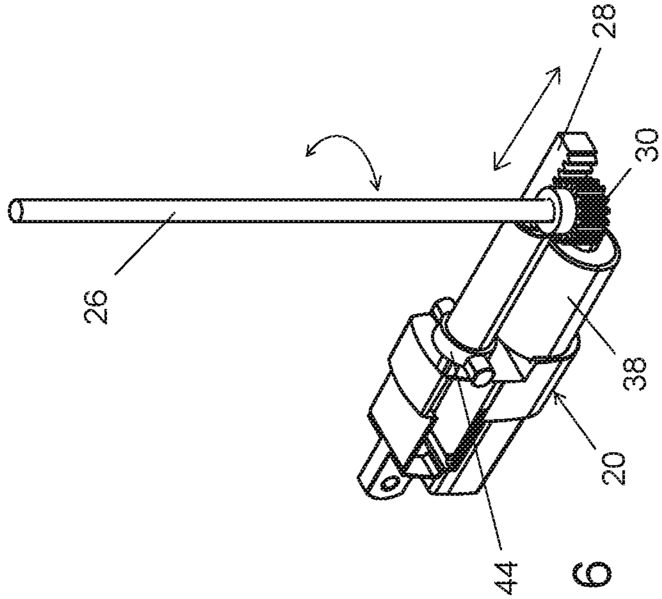
FIG. 6 is an enlarged rear perspective view of an electrically powered actuator and drive shaft of the locking assembly of FIGS. 4 and 5.
Figure 4:
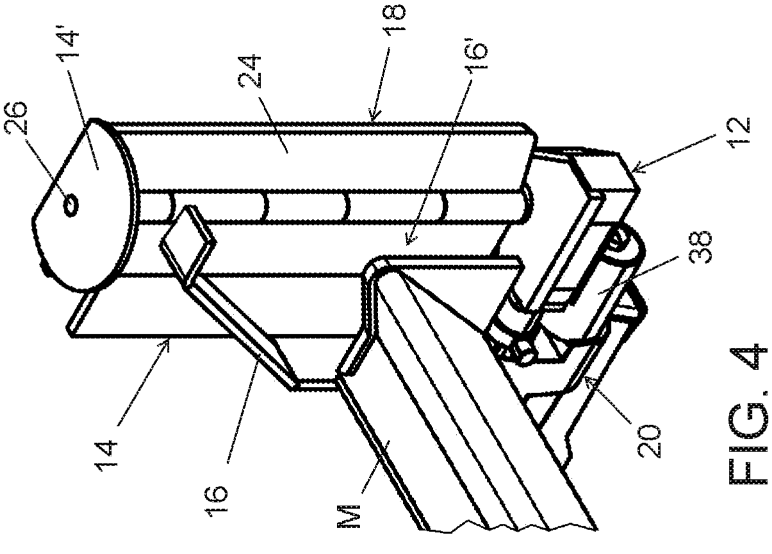
FIG. 4 is an enlarged rear perspective view of one locking assembly shown with a locker door in an open position.
Figure 7:
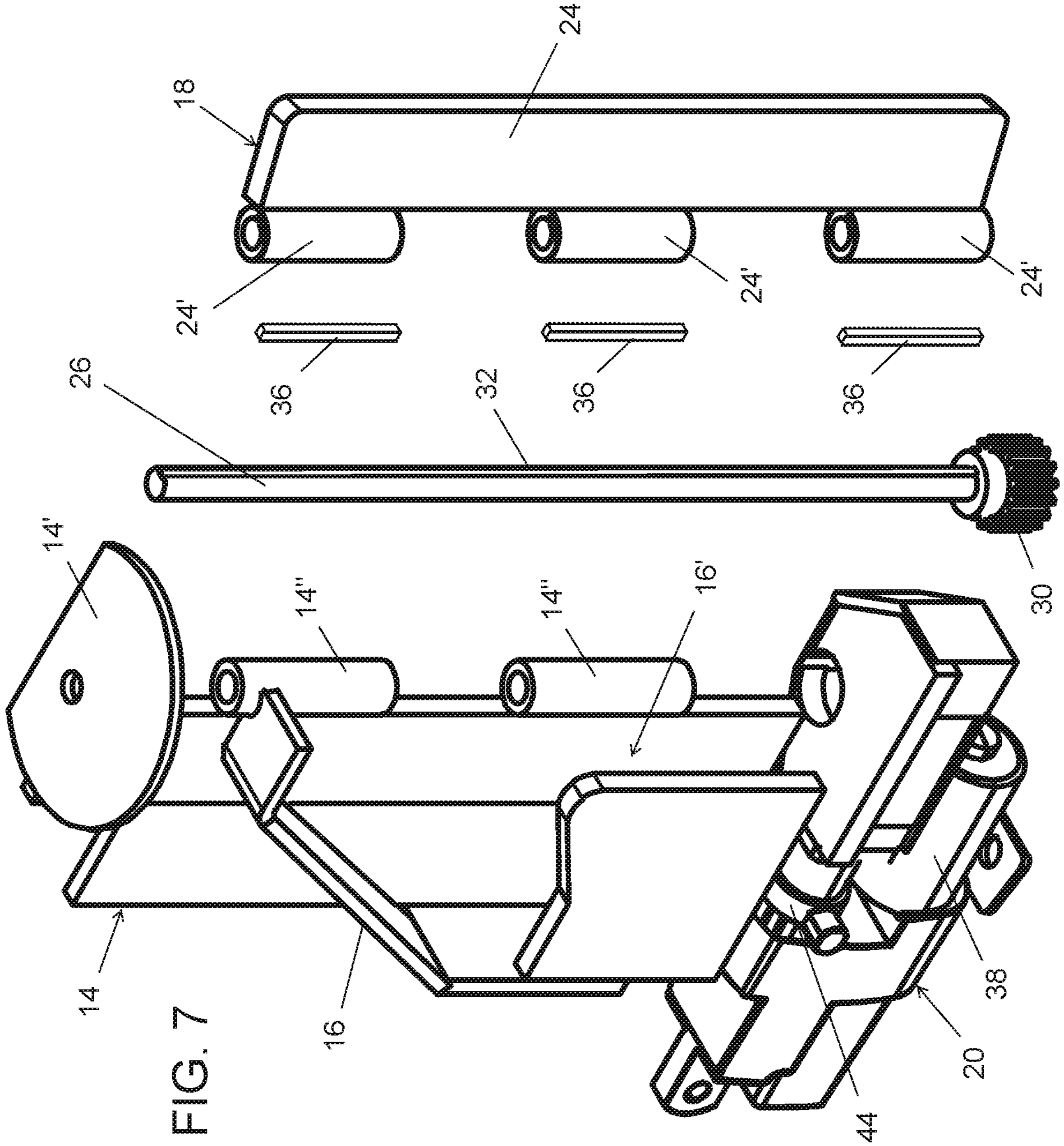
FIG. 7 is an enlarged rear perspective partially exploded view of the locking assembly of FIG. 4.
Figure 8:
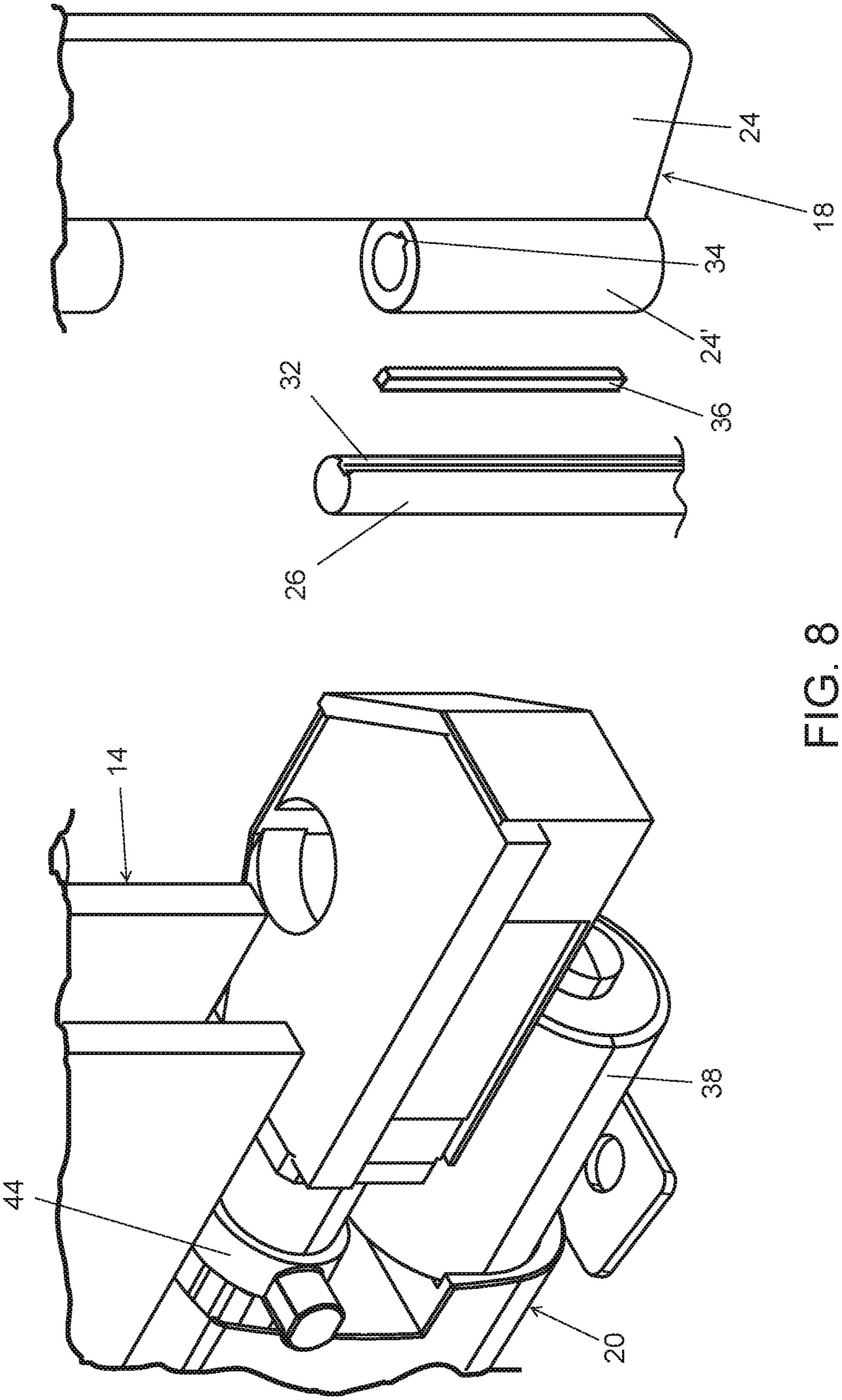
FIG. 8 is an enlarged rear perspective partially exploded view of a portion of the locking assembly of FIG. 4 providing a closer view of a keyway and key coupling between the drive shaft and locker door.

Within the example trunnion bar locker assembly 10, each actuator 20 further comprises a linear actuator. As shown in FIG. 6, each linear actuator 20 includes a rack 28 and engages a pinion 30, such as via the rack 28 having teeth that correspond to and mesh with teeth of the pinion 30. It will be appreciated from FIGS. 6 and 7 that each pinion 30 rotates one of the locker doors 18 between the open position shown in FIG. 4 and the closed position shown in FIG. 5. Further, each pinion 30 is connected to a respective shaft 26 that engages one of the locker doors 18. As shown in FIGS. 7 and 8, this is provided in part by the shaft 26 being keyed to the respective locker door 18, such as by use of an elongated keyway 32 in the shaft 26, a keyway 34 in each knuckle 24' connected to the panel 24 of the hinge formation of the locker door 18, which receive respective keys 36 for positive engagement between the shaft 26 and locker door 18. In the example shown, the linear actuator 20 includes an electric motor 38 and a ball screw linear actuator coupled to the pinion 30 by pushing and pulling the rack 28. It will be appreciated that alternative electrically powered actuators may be utilized to provide movement of the locker doors shown, such as by moving linkage connected thereto, or by other suitable configurations.

Figure 12:
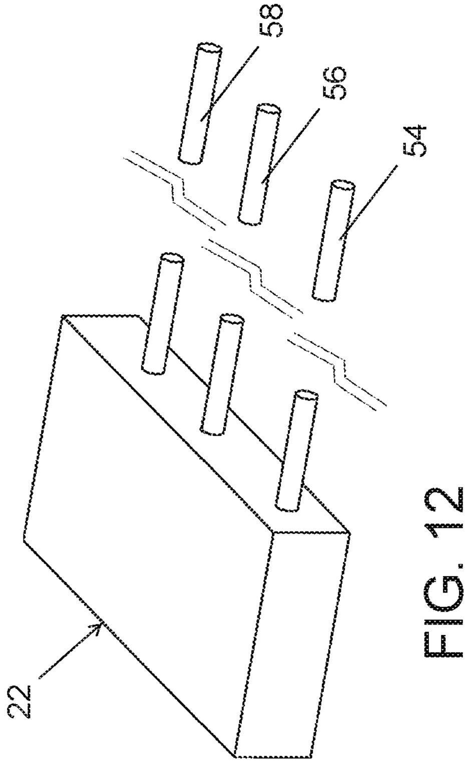
FIG. 12 is a diagrammatic view of an example controller enclosure for use in operating the example trunnion bar locker assembly.
Figure 13:
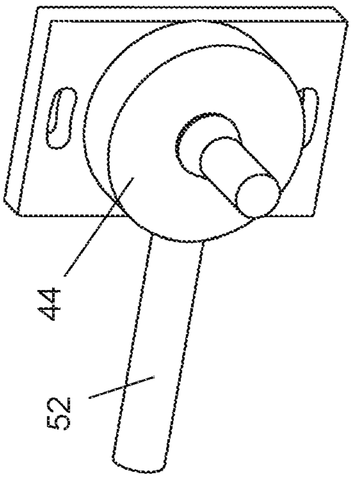
FIG. 13 is a diagrammatic perspective view of an example position sensor that indicates the position of the example trunnion bar locker assembly to the controller.
Figure 11:
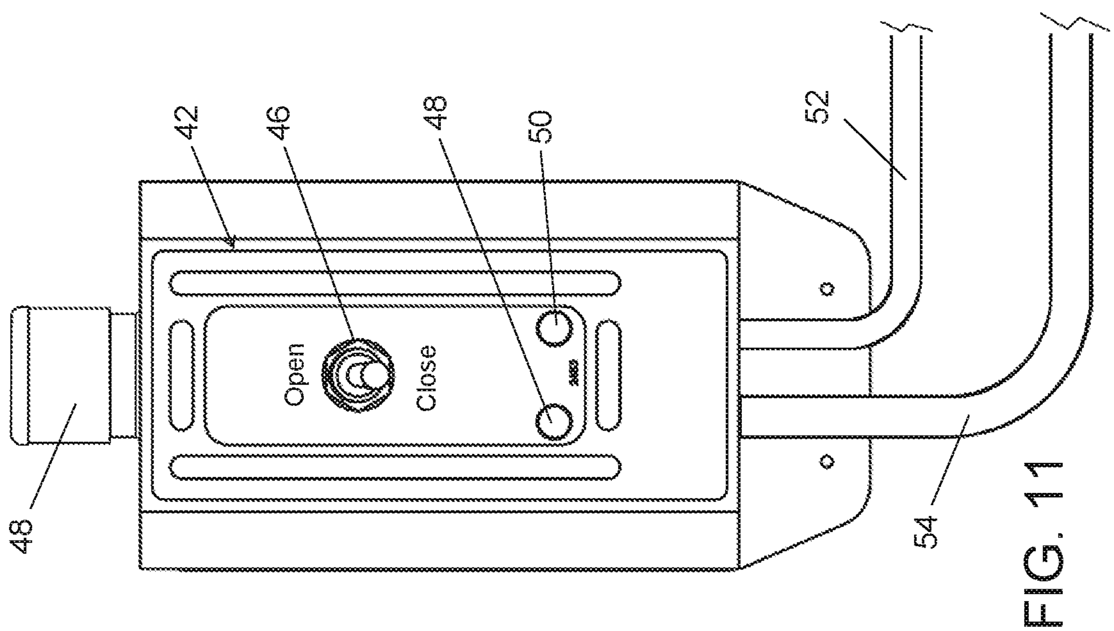
FIG. 11 is a perspective view of an exemplary operator interface for operating the example trunnion bar locker assembly.

FIGS. 11-13 illustrate components of an electrical control system for operating the trunnion bar locker assembly 10, which includes the controller 22 and an operator interface 42. The operator interface 42 is used by an operator to input commands. The operator interface 42 may be connected to the refuse vehicle V, so as to be in a convenient location to be utilized by the operator who is responsible for operating the trunnion bar locker assembly 10. The electrical control system further includes a position sensor 44 that determines the position of the locker door 18 relative to the base frame 14 during operation of the trunnion bar locker assembly 10. This provides an ability to ensure the locker doors 18 are not moved to the open position until the container C has been returned to the ground surface. As shown in FIGS. 6-8, in the present example, the position sensor 44 is connected to the linear actuator 20. In addition, it will be appreciated that the controller 22 includes a protective enclosure, which houses a logic circuit and processor. The logic circuit and processor prevent operation of lifting equipment, such as a winch or reeving cylinder of the refuse vehicle, to dump the refuse container C unless each locker door 18 is in the closed position.

As shown in FIG. 11, the operator interface 42 of the trunnion bar locker assembly 10 includes a plurality of electrical inputs, such as switches, buttons, and the like, associated with controlling the trunnion bar locker assembly 10. As seen in FIG. 11, the electrical inputs in the present example include a switch 46 associated with locker door movement commands, such as Open and Close positions. A safety energy Stop button 48 is prominently located atop the operator interface 42 for easy access by the operator, in the event that operation of the trunnion bar locker assembly 10 may need to be interrupted. The operator interface 42 further may include indicator lights 48, 50 and/or warning alarms or the like, which may be configured to confirm operations or alert an operator of particular circumstances relating to operation of the trunnion bar locker assembly 10.

The operator input commands entered into the operator interface 42 are provided to the controller 22 via cable or wiring 54, an example of which is shown in FIGS. 11 and 12. It also will be appreciated that such commands alternatively may be provided wirelessly. The controller 22 is part of the electrical control system and receives and processes the operator input commands to operate the trunnion bar locker assembly 10. The enclosure for the controller 22 may be mounted on or inside of the refuse vehicle V, remotely from the trunnion bar locker assembly 10, so as to be protected from physical or environmental hazards.

The controller 22 may be electrically connected to other system components in the electrical control system by wiring, such as an example power cable 56 for connection to a power source, such as a vehicle or accessory battery. The controller 22 also may be connected to each of the locking assemblies 12, such as by a control cable 58 connected to first and second locking assembly electrical linear actuators 20. Depending on the configuration of the trunnion bar locker assembly 10, the controller 22 may have additional control cables, for the position sensor 44 or other components, as needed.

Figure 9:
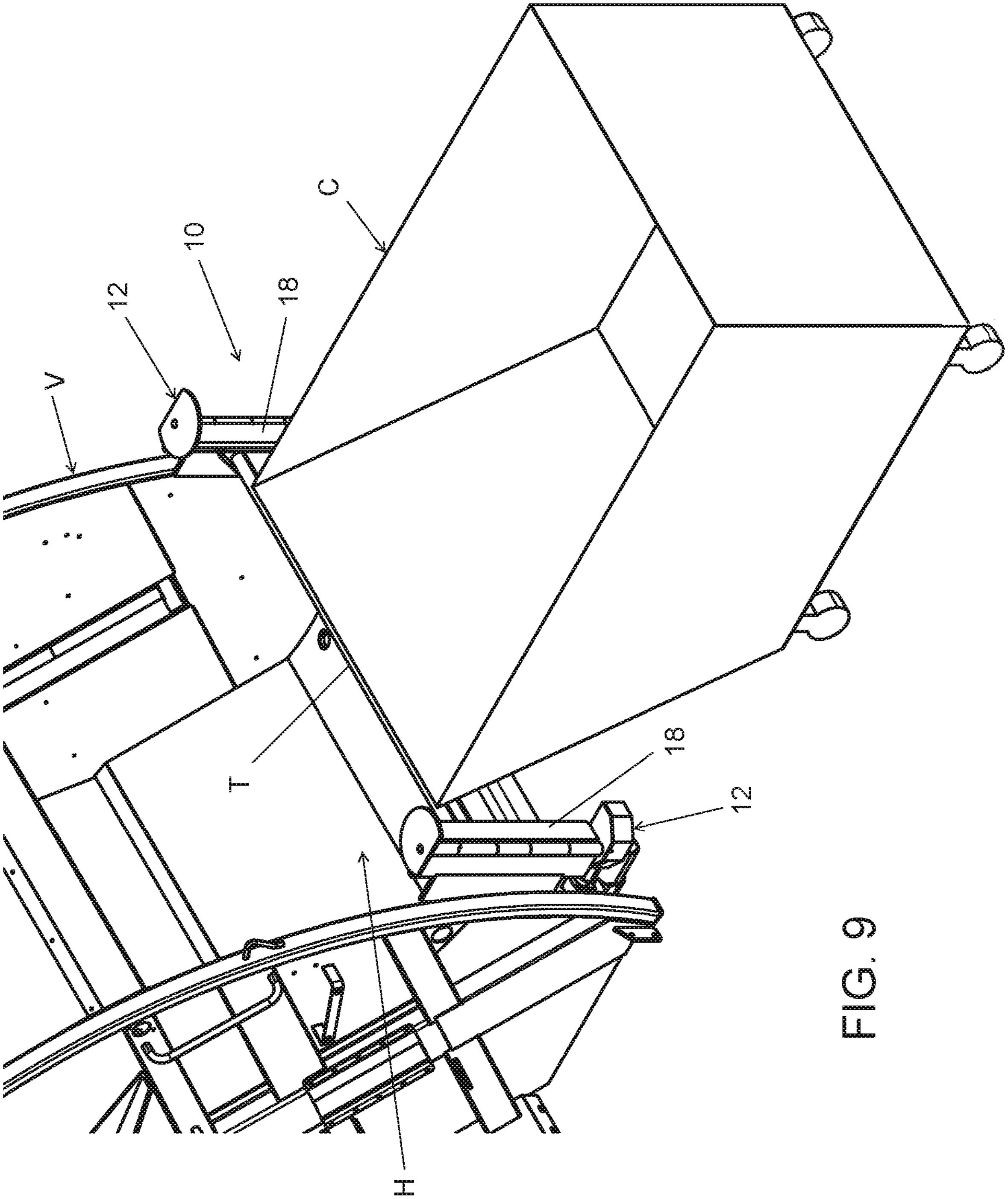
FIG. 9 is a rear perspective view of a container of FIG. 1 having a trunnion bar received by the trunnion bar locker assembly on the rear of the refuse vehicle of FIG. 3, with the locker doors in the closed position and the container ready to be titled for dumping contents into the hopper of the rear load refuse vehicle or after having been returned to a ground surface after dumping.
Figure 10:
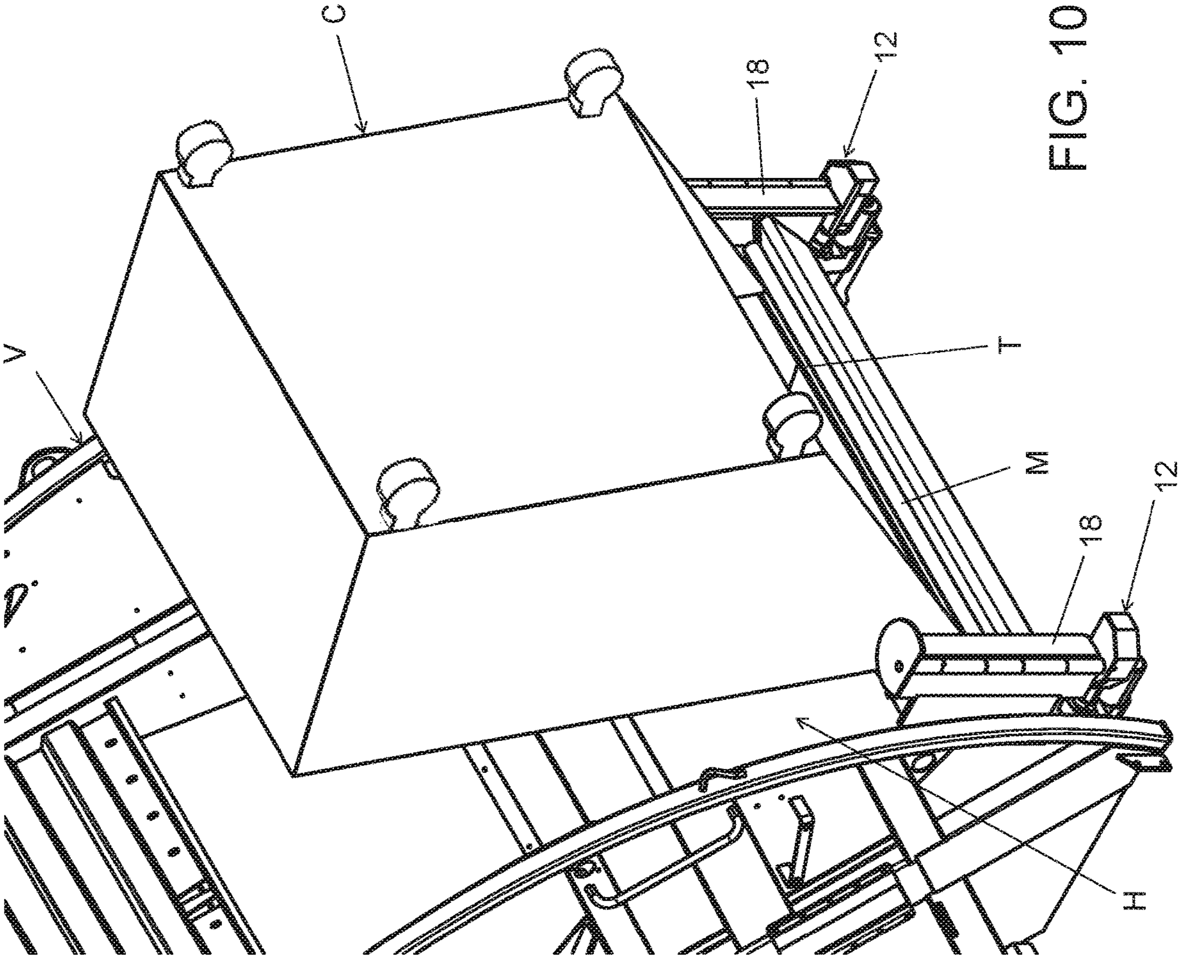
FIG. 10 is a rear perspective view of the container of FIG. 9 coupled to the trunnion bar locker assembly and tilted to a position to dump contents into the hopper of the rear load refuse vehicle.

Each locking assembly 12 may use a position sensor 44 as part of the electrical control system and it is electrically connected to the operator interface 42, such as by the cable 52. The position sensor 44 permits the controller 22 to monitor the position of the locker doors 18 of the trunnion bar locker assembly 10. Thus, the controller 22 may use the position sensors 44 and linear actuators 20 to ensure the trunnion bar T remains confined to the trunnion bar receivers 16 for movement of the container C. As shown in FIGS. 9 and 10, with the ends E of the trunnion bar T in the receivers 16 and the locker doors 18 in the closed position, the container C is locked to the rear of the refuse vehicle V. Lifting equipment, such as a winch or reeving cylinder then may be used to tilt the container C, as shown in FIG. 10, to dump the contents of the container C into the hopper H of the refuse vehicle V. Thereafter, the container C may be lowered to the ground surface while remaining locked to the refuse vehicle V, which also is illustrated in FIG. 9. After the container C has safely returned to the ground surface, the trunnion bar locker assembly 10 may be actuated to move the locker doors 18 to the open position, unlocking the trunnion bar T from the refuse vehicle V.

It will be appreciated that the vehicle V may have alternative features, such as notches in the rear sill S to accommodate bin lifters or other configurations to diversify the collection capabilities, while still employing the trunnion bar locker assembly 10, or with the trunnion bar locker assembly 10 removed.

As noted, the embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

The invention claimed is:

1. A trunnion bar locker assembly for a rear load refuse vehicle for use when dumping a refuse container having a trunnion bar, comprising:
- a pair of spaced apart locking assemblies;
  - each locking assembly further comprising:
    - a base frame to be connected to the refuse vehicle;
    - a trunnion bar receiver connected to the base frame;
    - a locker door coupled to the base frame and having an open position wherein the trunnion bar receiver removably receives an end of the trunnion bar of the refuse container, and a closed position wherein the locker door confines the end of the trunnion bar in the receiver;
    - an electrically powered linear actuator comprising a rack and pinion and being coupled to the base frame and to the locker door;
- a controller connected to each respective locking assembly to control the linear actuator to move the locker door between the open and closed positions.

2. The trunnion bar locker assembly of claim 1, wherein each base frame is configured to be connected to the refuse vehicle proximate an end of a rear sill of the refuse vehicle.

3. The trunnion bar locker assembly of claim 2, wherein each base frame is configured to be connected to a mounting structure that is connected to the refuse vehicle proximate a rear sill of the refuse vehicle.

4. The trunnion bar locker assembly of claim 1, wherein each locker door is pivotably coupled to the base frame.

5. The trunnion bar locker assembly of claim 4, wherein each locker door further comprises a panel pivotably coupled to the base frame via a shaft.

6. The trunnion bar locker assembly of claim 1, wherein each pinion rotates one of the locker doors between the open and closed positions.

7. The trunnion bar locker assembly of claim 6, wherein each pinion is connected to a shaft that engages one of the locker doors.

8. The trunnion bar locker assembly of claim 7, wherein the shaft is keyed to the respective locker door.

9. The trunnion bar locker assembly of claim 7, wherein the linear actuator further comprises a ball screw linear actuator.

10. The trunnion bar locker assembly of claim 1, further comprises an electrical control system for operating the trunnion bar locker assembly and which comprises a controller and an operator interface.

11. The trunnion bar locker assembly of claim 10, wherein the electrical control system further comprises a position sensor that determines a position of the locker door relative to the base frame during operation of the trunnion bar locker assembly.

12. The trunnion bar locker assembly of claim 11, wherein the position sensor is connected to the linear actuator.

13. The trunnion bar locker assembly of claim 11, wherein the controller further comprises a logic circuit and processor.

14. The trunnion bar locker assembly of claim 13, wherein the logic circuit and processor prevent operation of lifting equipment to dump the refuse container unless each locker door is in the closed position.

15. The trunnion bar locker assembly of claim 10, wherein the operator interface further comprises a plurality of electrical inputs associated with controlling the trunnion bar locker assembly.

16. The trunnion bar locker assembly of claim 15, wherein the electrical inputs further comprise a switch associated with locker door movement commands that include at least "Open" and "Close".

17. The trunnion bar locker assembly of claim 15, wherein the electrical inputs further comprise at least a "Stop" button.

18. The trunnion bar locker assembly of claim 15, wherein the electrical inputs further comprise lights associated with operation of the trunnion locker bar assembly.

* * * * *